May 12, 1953             C. L. LONGERT             2,638,557
WHEEL HUB WITH BUILT-IN DYNAMOS, ESPECIALLY
FOR BICYCLES AND MOTOR BICYCLES
Filed July 7, 1950
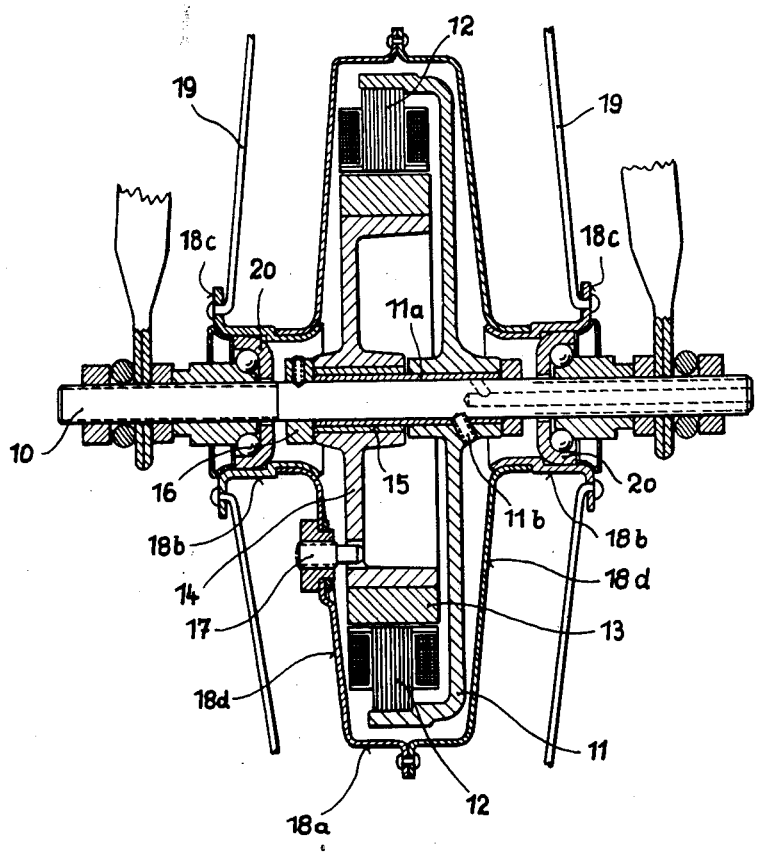
Inventor.
Christian Leo Longert.

Patented May 12, 1953

2,638,557

UNITED STATES PATENT OFFICE 2,638,557

WHEEL HUB WITH BUILT-IN DYNAMOS, ESPECIALLY FOR BICYCLES AND MOTOR BICYCLES

Christian Leo Longert, Winterberg, Germany

Application July 7, 1950, Serial No. 172,568
In Germany July 20, 1949

7 Claims. (Cl. 310—75)

The invention relates to wheel hubs, more especially for pedal bicycles and motor bicycles, said hubs being of the kind, provided with a built-in dynamo, the rotating part of the dynamo being directly coupled with the bush of the wheel hub.

Such arrangements differ favourably from the many constructions of wheel hubs having a built-in dynamo, which have already been proposed, in that no mechanical transmission mechanisms are required and thus the construction of such arrangements is simplified and long life is ensured with the minimum of maintenance requirements. It has already been proposed to couple the rotating part of the dynamo directly with the wheel hub, so that the dynamo rotates at the relatively low speed of the wheel. However in such cases the wheel is of unsymmetrical form, and spokes of normal length can only be fitted on one side, while the spokes on the other side must be appreciably shorter. Moreover, with this known constructional form, considerable difficulties arise in sealing the dynamo externally to prevent the penetration of moisture, dirt, and other foreign matter.

An object of the present invention is to overcome the foregoing disadvantages. With this and other objects in view, the present invention comprises a wheel hub of the kind described wherein there are provided at both ends of the sleeve of the hub, the centre part of which is arranged to form a protective housing for the dynamo, concentric rings of recesses of equal diameter for the accommodation of threaded spokes of normal length.

The rotating part of the dynamo need not be connected to the housing by screwing or by other means, but it is much more convenient to convenient to connect the wheel hub and the rotating part of the dynamo together by a releasable coupling in order that the dynamo may be completely removed, for example during the summer months, so that no-load running before driving may be avoided. In accordance with the invention, the rotating part of the dynamo may be mounted on the stationary spindle of the wheel with the aid of a preferably oilless bearing material. The load on this bearing is only small since no forces are set up in the direction of the axis of the wheel and in practice only torsional forces are exerted in the surface lying vertically above it, the said torsional forces being more or less equally distributed over the entire circumference. The forces set up owing to the stressing of the spokes in the direction of the axis of the wheel may be taken up as desired, by the wheel spindle or by the sleeve of the hub. If the centre part thereof is widened to form a protective housing for the dynamo, it is preferable so to fashion the boundary surfaces of this widened portion which lie substantially perpendicularly to the axis of the wheel, that they can take up the said forces without being deformed. To this end, it is preferable in the first place to arrange these surfaces obliquely, i. e. in the manner of struts with respect to the axis of the wheel. It may also be advantageous to protect these surfaces by suitable configuration or the like.

For a better understanding of the invention, an embodiment thereof will hereinafter be more fully described with reference to the accompanying drawing, which illustrates, by way of example, a vertical section through a constructional form of the arrangement according to the invention.

Rigidly mounted on the spindle 10 of the front wheel hub is a disc-shaped member 11 which supports on its circumference a series of coils 12 extending radially inwards toward the spindle 10 of the wheel. The member 11 is provided with a sleeve or bush 11a of brass or similar material held fast on the spindle 10 by a bolt 11b. Within the coil member 11, 12, there is provided a magnetic ring 13 which consists, in the illustrated constructional form, of a four-pole permanent magnet. The magnetic ring 13 is mounted on the spindle 10 by means of a disc-shaped hub member 14. The hub member 14 is rotatably mounted on the spindle 10 by means of an oilless bearing bush 15, formed of, for example, a sintered mass or a mass of synthetic material. In the illustrated constructional form, the bearing bush 15 rotates on the projecting end of the fixed brass bush 11a so that the rotating parts 13, 14 always rotate concentrically in the ring of coils. The coil member 11 and an adjusting ring 16 prevent displacement of the rotating parts 13, 14 in the axial direction.

In order to generate current in the stationary coils 12, the magnetic ring 13 must be rotated, which is achieved by means of a coupling screw 17 connecting the housing 18a to the hub portion 14 of the ring 13.

The bearing bush of the hub comprises the sleeves 18b formed with radial flanges 18c each having concentrically arranged recesses for engagement by the spokes 19. The bearing bush comprises bearing brasses 20 for the conical bearings as well as the widened housing portion 18a which lies in the centre of the flanges 18c and which surrounds the actual dynamo 12, 13 to form a protective housing therefor. The flanges 18c of the hub, which are located on either side of the housing 18a, are thus of equal size, and the recesses are identical and arranged in a similar manner to the recesses in a normal commercially obtainable wheel hub so that the built-in dynamo can be used with spokes 19 which are of standard construction and length.

Since the compressive forces in the direction of the wheel axis, which are set up due to the stressing of the spokes must be taken up by the hub sleeves 18b, 18a, and the surfaces 18d extending substantially perpendicularly with respect to the spindle 10 may be made of conical form and thus fitted in the manner of struts in relation to one another.

I claim:

1. A wheel hub for bicycles and the like having a built-in electric generator, said wheel hub comprising a spindle fixed in a fork, a hub casing, a tubular extension projecting from said casing axially outwardly at either end thereof, bearing race means in each of said tubular extensions for rotatably disposing said housing on said spindle, a flange extending radially from each tubular extension, holes formed in each flange on a circular line thereof for anchoring the inner ends of the wheel spokes therein, the diameters of the circles defining in said flanges said spoke-anchoring holes being identical and the axial spacing between said flanges being on the order of about twice the amount of the diameters of said circles, a stator in said casing comprising a radially extending disklike wall member which is fixedly mounted on said spindle and having an annular wall extending peripherally of said disklike wall axially thereof and carrying stator coils directed radially inwardly in the direction of said spindle, a rotor in said casing comprising a radially directed disklike supporting wall extending substantially in parallel with the disklike wall member of said stator, said supporting wall being rotatably mounted on said spindle and carrying magnet means peripherally thereof for coaction with said stator coils, and a drive member carried by a wall of said casing and axially inwardly extending therefrom for direct driving coaction with said rotor.

2. The structure as set forth in claim 1, together with a tubular bushing fixed on said spindle, the radially extending disklike wall member of said stator being fixedly mounted on said bushing and the radially directed disklike supporting wall of said rotor being rotatably journalled thereon.

3. The structure as set forth in claim 1, together with a tubular bushing fixed on said spindle, the radially extending disklike wall member of said stator comprising a central tubular hub member which is fixedly mounted at one end of said tubular bushing, the other free end of said bushing extending axially away from said central tubular hub member of said stator, the radially directed disklike supporting wall of said rotor comprising a central hublike journal member rotatably disposed on the free end of said tubular bushing.

4. The structure as set forth in claim 1, wherein said casing comprises two cuplike shells of axially and radially symmetrical configuration, and means for joining said shells along a line which extends centrally circumferentially of the casing formed thereby.

5. The structure as set forth in claim 1, wherein said hub casing comprises two cuplike shells having symmetrically radially outwardly and axially inwardly tapering side walls terminating in peripherally disposed axially inwardly directed end walls, the free inner ends of said end walls abutting, and means for joining said abutting ends to form a common axially extending end wall.

6. A hub for a wheel of a vehicle such as a bicycle or the like having an electric generator assembly consisting of the following essential elements, namely, a stationary shaft mounted in a fork extending from the vehicle frame, a first disk keyed to said shaft and radially extending therefrom and having a peripheral axially extending wall, a plurality of cores carried by said wall inside thereof and extending radially inwardly therefrom, each core carrying a coil and constituting a stator pole piece, a second disk rotatably mounted on said shaft and radially extending therefrom and having a peripherally axially extending flange, a plurality of permanent magnets carried by said flange outside thereof and extending radially outwardly therefrom, said magnets constituting rotor pole pieces for magnetic coaction with said stator pole pieces, a casing for enclosing said disks and pole pieces, said casing comprising tubular end members rotatably mounted on said shaft, a side wall extending from the inner end of each tubular end member radially outwardly therefrom and tapering axially inwardly and having an annular axially inwardly directed peripheral outer wall terminating in a radially extending mounting flange abutting the corresponding mounting flange of the peripheral outer wall of the other side wall, means for securing said mounting flanges together, a radially extending spoke flange carried by each tubular end member at the outer end thereof for anchoring the inner ends of the wheel spokes thereto, and a coupling member adjustably disposed in one of the side walls of said housing and extending inside thereof for engaging a portion of said second rotatably mounted disk to couple said disk for rotation with said housing when the housing is rotated incident to the rotation of said wheel.

7. The structure defined in claim 6, wherein the inner ends of said spokes are anchored in said radially extending spoke flanges along circular lines of identical diameter which corresponds to about one-half of the axial spacing of said spoke flanges.

CHRISTIAN LEO LONGERT.

References Cited in the file of this patent

UNITED STATES PATENTS

| Number | Name | Date |
|---|---|---|
| 2,256,794 | Schwab | Sept. 23, 1941 |
| 2,511,489 | Woermbke | June 13, 1950 |

FOREIGN PATENTS

| Number | Country | Date |
|---|---|---|
| 38,612 | Netherlands | July 15, 1936 |
| 90,495 | Sweden | Oct. 12, 1937 |
| 200,883 | Switzerland | Feb. 1, 1939 |
| 681,901 | Germany | Oct. 4, 1939 |